No. 869,689. PATENTED OCT. 29, 1907.
A. E. BROWN.
CAR PUSHER.
APPLICATION FILED JUNE 14, 1907.
10 SHEETS—SHEET 1.

No. 869,689. PATENTED OCT. 29, 1907.
A. E. BROWN.
CAR PUSHER.
APPLICATION FILED JUNE 14, 1907.
10 SHEETS—SHEET 3.

WITNESSES:
INVENTOR
Alexander E. Brown
BY George C. Wing
his ATTORNEY

UNITED STATES PATENT OFFICE.

ALEXANDER E. BROWN, OF CLEVELAND, OHIO, ASSIGNOR TO THE BROWN HOISTING MACHINERY COMPANY, OF CLEVELAND, OHIO.

CAR-PUSHER.

No. 869,689.   Specification of Letters Patent.   Patented Oct. 29, 1907.

Application filed June 14, 1907. Serial No. 379,072.

*To all whom it may concern:*

Be it known that I, ALEXANDER E. BROWN, a citizen of the United States, residing at Cleveland, in the county of Cuyahoga and State of Ohio, have invented a new and useful Improvement in Car-Pushers, of which I hereby declare the following to be a full, clear, and exact description, due reference being had and intended to the several drawings accompanying and making a part of this specification.
My invention is intended more particularly, for use for the purpose of bringing cars up and into the so-called car-tipples to be thereby divested of their load, and, by an arrangement that—unlike prevailing methods of feeding cars into tipples—is not confined to a single fixed location, in the vicinity of a stationary tipple, but that may travel to any desired distance, on surface tracks like an ordinary locomotive, thereby not only enabling it to serve more than one car, in a single movement, but also rendering it possible to have the tipple itself portable along the dock, or unloading ground.

As is well understood by those who have to do with the handling of coal, ore or other gross material by modern methods, one or another of the special forms of tipples in use, are stationed at some predetermined point where the loads are to be discharged. An approach track leads to the tipple on an ascending grade above a sunken subsidiary track of similar grade, and the cars are sent in on to this approach track from the main lines in the yard by connecting switches. On the sunken track is a frame-work car, commonly known as the "ground-hog," that can be drawn up the declivity on its track toward the tipple by a drum and cable apparatus in or near the same. Both this and the approach track have substantially the same grade-angle, so that a loaded car, when switched upon the latter track, will take its place, by force of gravity, at the outer terminal of this track and immediately in front of and against the "ground-hog" when the latter is in a corresponding position on its own track. If the ground-hog is now pulled in towards the tipple it will of course propel the car up the declivity until it enters the tipple and is in place for clamping and overturning.

It is manifest that unless provision is made for the purpose by an undesirable and often impracticable extension of the sunken track, and, at an excessive increase of the drum and cable mechanism, this arrangement will not be adequate for handling more than one loaded car at a time, and, further, that, however the dimensions, location and capacity of a feeding apparatus of this kind, are originally laid out, neither these nor the location of the tipple itself can in any manner be afterwards changed to meet varying conditions as they arise.

As before said, my present invention is intended,
among other things, to dispense with the need of a sunken track and the consequent limited range of the pusher and to do away with any fixedness of the tipple itself, at the same time, enabling them both to be freely traversed from one point to another, as occasion requires, and without need of new or special preparation therefor.

As will appear my invention is further extended to and covers a special form of pusher herein described, more especially for use in connection with hoisting and conveying machines of a certain type as pointed out.

In the drawings

Similar reference characters are used on similar parts throughout the drawings.

In said drawings A, A′ are parallel struts connected to posts P, which latter, in turn, are connected together by cross-girders G G′ into a rectangular framework top supported by said posts. The latter are themselves supported on sills S S′. Trucks T T′, are each made up in this case of a pair of wheels W and W′ carrying the entire framework. Suitable motors M M′, through a train of gearing indicated by O and O′ and shafts R and R′ drive said trucks. For the purpose of traction, a pile of ballast, of concrete, or other material (the upper surface of which is indicated by the line B′ and the lower by B) may be added.

The form of pusher for tipples, shown in Figs. 1 to 14 is characterized by having the two arms D and D′, extending horizontally along the top of said framework so as to overhang or project beyond the same to a distance substantially the same as that between the exterior of the tipple and the car when the latter is placed for overturning within the same, and thereby, permitting the car to be pushed to said place without the pusher itself coming in contact with the tipple. Said arms are pivoted to the cross-girder G, at the points $g$ and $g'$, to enable them to be moved laterally or distended about said pivotal points, and thrown out of engagement with the car when desired, and to either side respectively, of the cars' trackway. Good construction requires that said pivotal points should be located at such points on the cross-girder G that, when in the engagement referred to that they will be in direct overhead alinement with the car to be pushed. The forward ends of the arms D, D', are carried downwardly at right angles by the rigid parts or portions E E', to a distance, that will bring their lower ends substantially on a level with the bumpers of the car to be moved, when the pusher and car are on the same track. The parts E, E' are each made up of two oppositely faced channels that are held, in such relation, by cross-plates $p$ $p'$ that reach downwardly on their exterior to a point somewhat above their lower ends. The parts E E', throughout the portion carrying said cover-plates, will thus have a box-section. In order to afford a level trackway for the track wheels K, K, through the interior of the parts E E', below said cover-plates, the inner opposite faces of said channels are reinforced by the flat-faced track-bases $t$, that are fitted in and along such interior portion, against the beveled surfaces of the channel flanges. Arranged as four-wheeled trucks to bear and travel upon said track-base are the wheels K K which, as will be seen, are, in each case connected together by a housing H. H'. To provide or make up for any relative inequality, in a particular case, between the two points on the surface of a car, at which the parts E E' engage the same, said housings H and H' are given a degree of compensating swivel with respect to said trucks. As shown in the drawings, this is effected by using the transverse journals, or cylindrical bearings, $b$ $b'$ for the truck-wheel axles $a$ $a'$, and connecting the same to and within the housing by the opposite, integral trunnions $u$, $u'$ on said bearings. For convenience said housing is shown as composed of the separable half-pieces $h^1$ and $h^2$ that are bolted together, as indicated, when the trucks and journals are in their places therein. The housing should be of suitable dimensions to project both before and behind the opposite channels between which it is to vertically oscillate.

Figure 12:
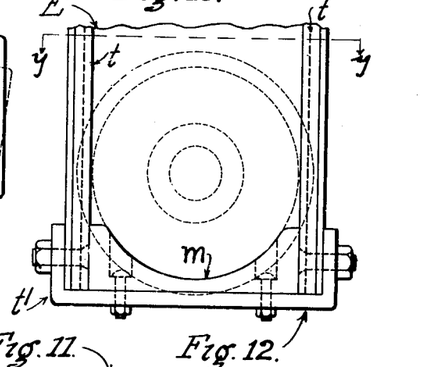
Fig. 12 is a vertical section of the lower portion of the front arms of the pusher.
Figure 13:
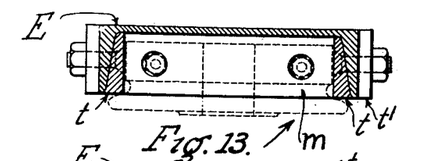
Fig. 13 is a horizontal sectional view, in the direction of the arrows, on the lines $y$, $y$, of Fig. 12.
Figure 14:
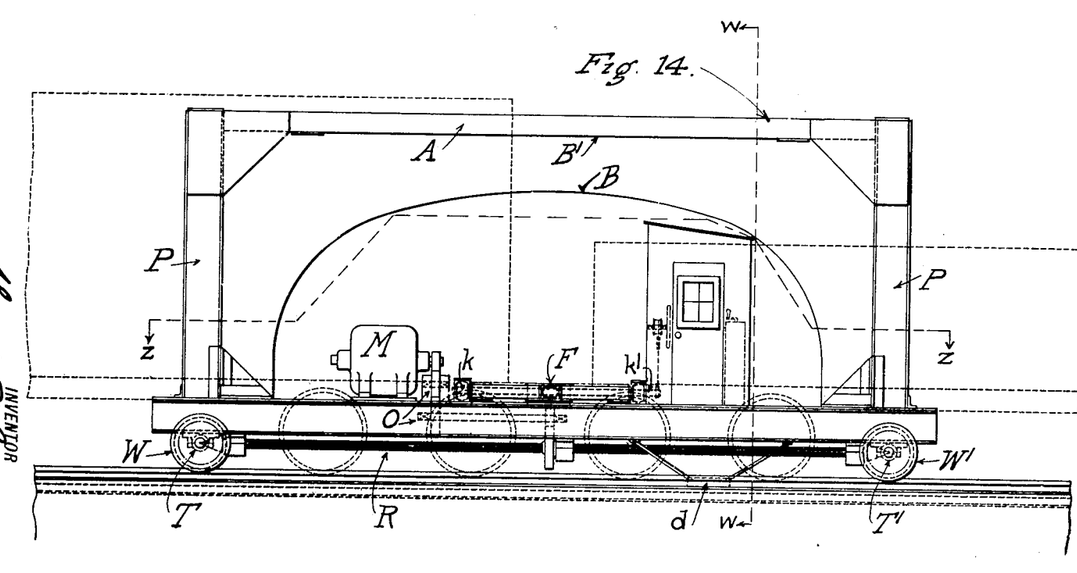
Fig. 14 is a side elevation of a special form of pusher for switching purposes, more particularly for use in connection with a style of hoisting and conveying machine known as a "fast plant.
Figure 15:
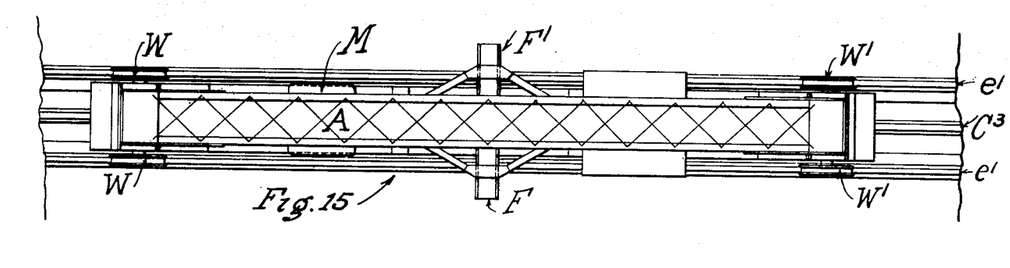
" Fig. 15 is a plan view of the same.
Figure 16:
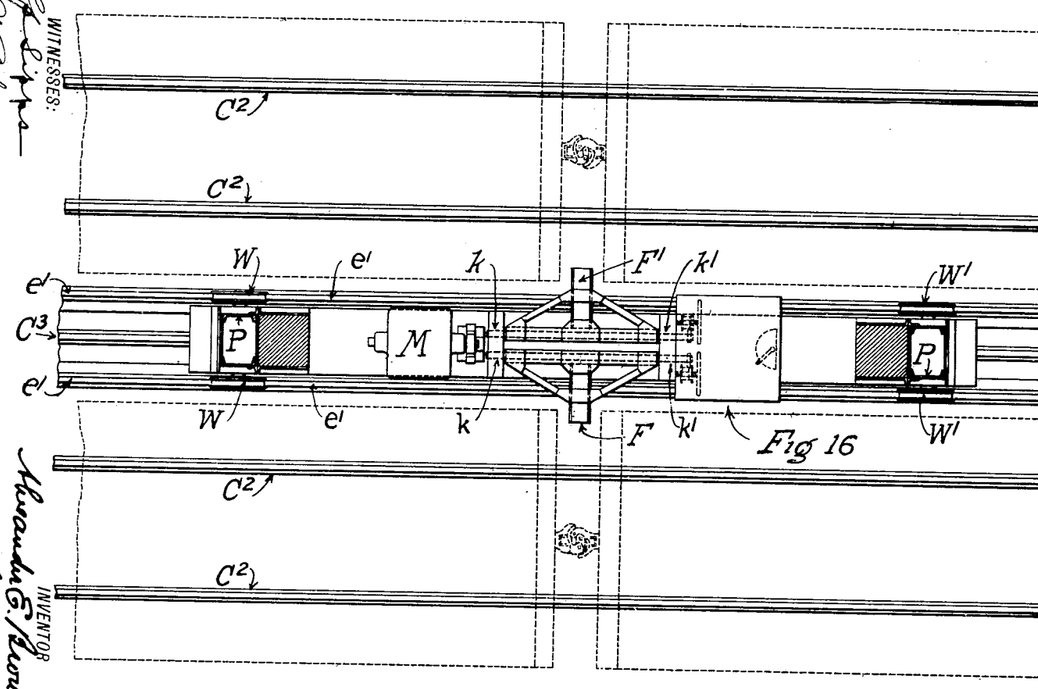
Fig. 16 is a horizontal sectional plan view on the lines $z$, $z$, of Fig. 14.
Figure 17:
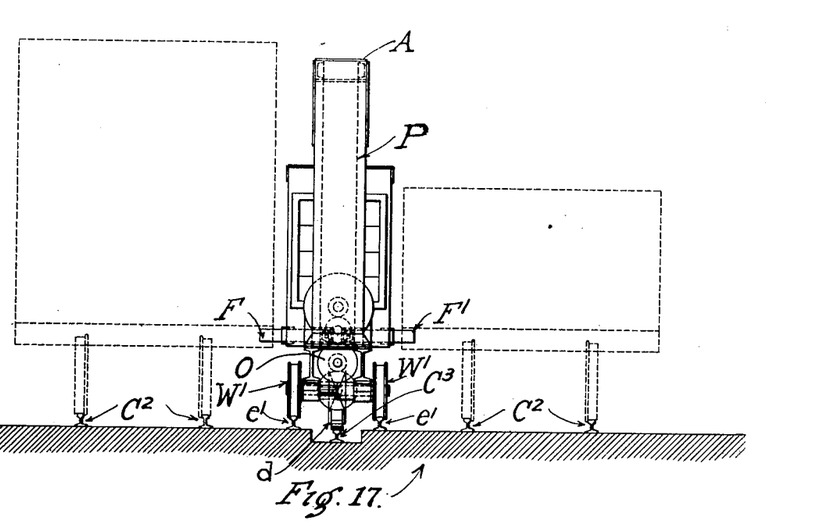
Fig. 17 is an end view of said special form when in engagement with cars (shown in dotted lines) at each side of the same, and, Fig. 18 is a vertical sectional view, on the lines $w$, $w$, of Fig. 14.
Figure 18:
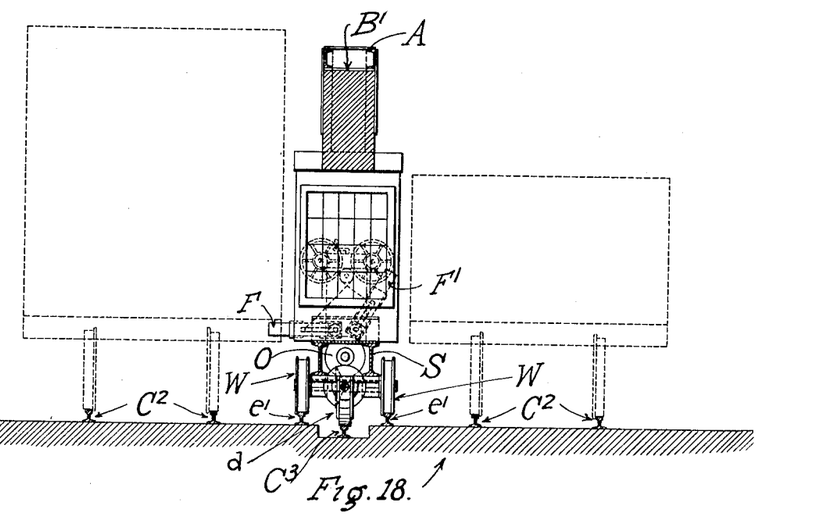

To prevent its falling below the bumpers in case of a sudden or unexpected disengagement therefrom it is well to provide the housings at their top with the projecting flanges $f$ and $f'$. The trucks, thus made up, are inserted within and between said opposite channels, at the lower ends of the parts E and E', with the wheels K, K, against the track-plates $t$, and are secured, in place, by bolting across the lower ends of said channels, as shown (Fig. 12), the U-shaped bars $t'$, $t'$. Figs. 12 and 13, show a rubber bumper $m$ bolted to the upper face of said bars, to meet said trucks when at the lower limit of their travel.

In the drawings, L is the tipple proper (Figs. 2 and 4) which is shown as portable, being mounted on trucks that travel on the rails C C'. The rails upon which the pusher travels in the performance of its prescribed functions, in the type shown in Figs. 1 to 14, are denoted by C and C' which are respectively located on the outer side of the rails $C^2$ $C^2$ of the approach track to the tipple for loaded cars.

A feed-rail, for a supposed 3d-rail electrical system, having contact-shoes $d$ $d$, is indicated by $C^3$ in the drawings.

$h$, $h$ are couplers provided at the front end of the pusher, to engage corresponding couplers in the tipple when it is desired to pull the latter, by means of the pusher, along its rails from one operative place to another.

Figure 1:
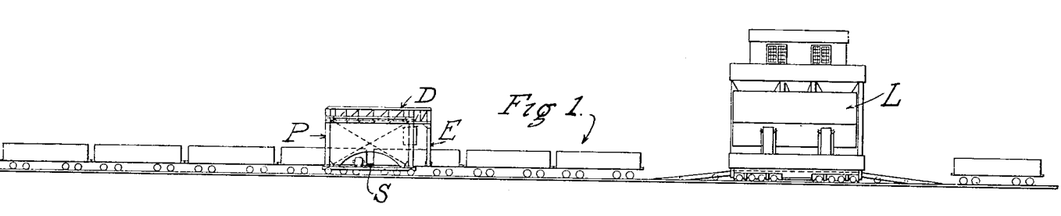
Figure 1 is a side elevation of a tipple and train of cars in position to be administered to by the pusher shown.
Figure 2:
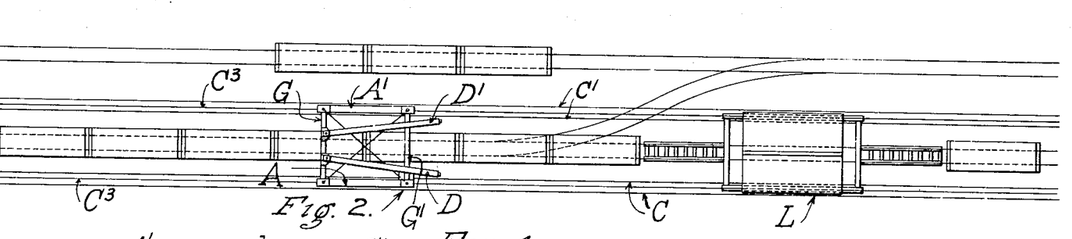
Fig. 2 is a plan view of the same.
Figure 3:
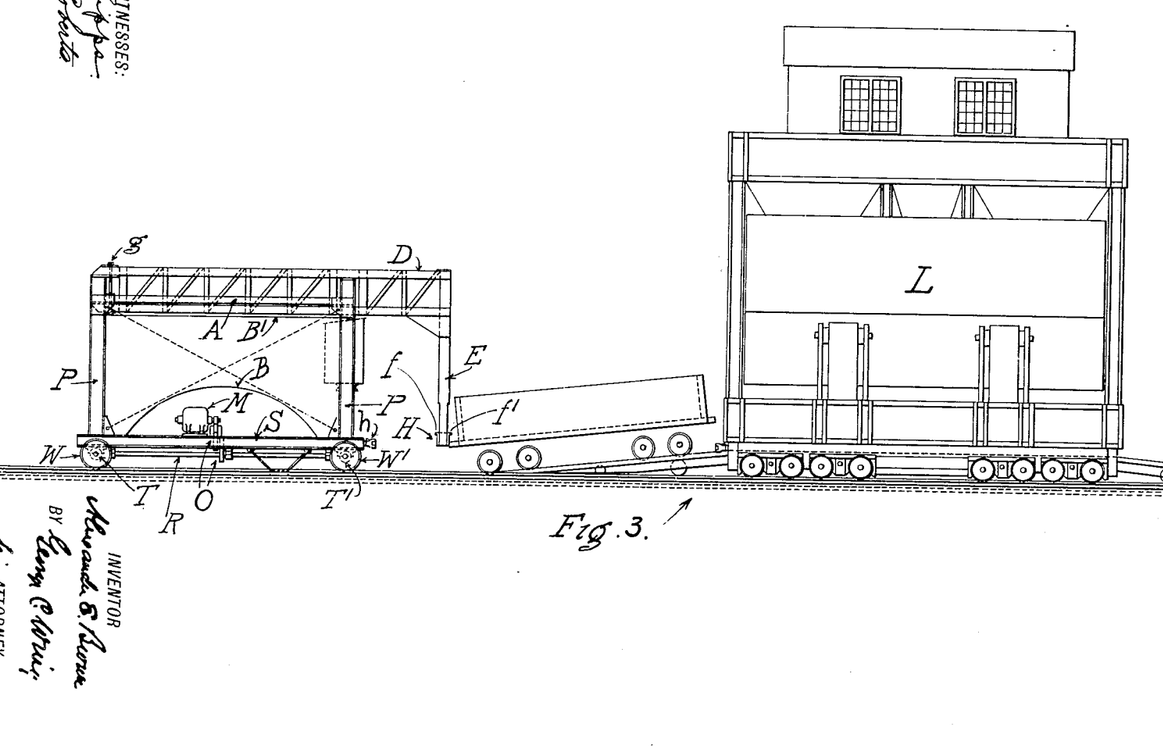
Fig. 3 is an enlarged side-elevation of a car and pusher when brought up thereby immediately before the tipple.
Figure 4:
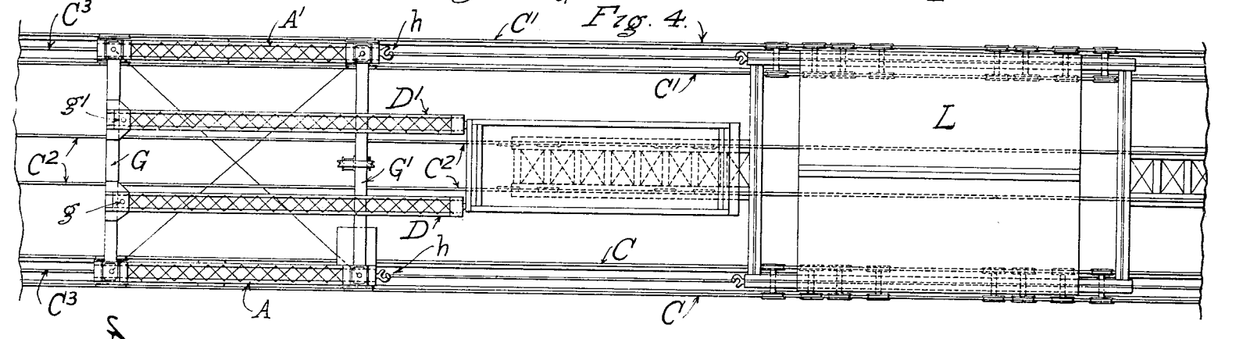
Fig. 4 is a plan view of the same.
Figure 5:
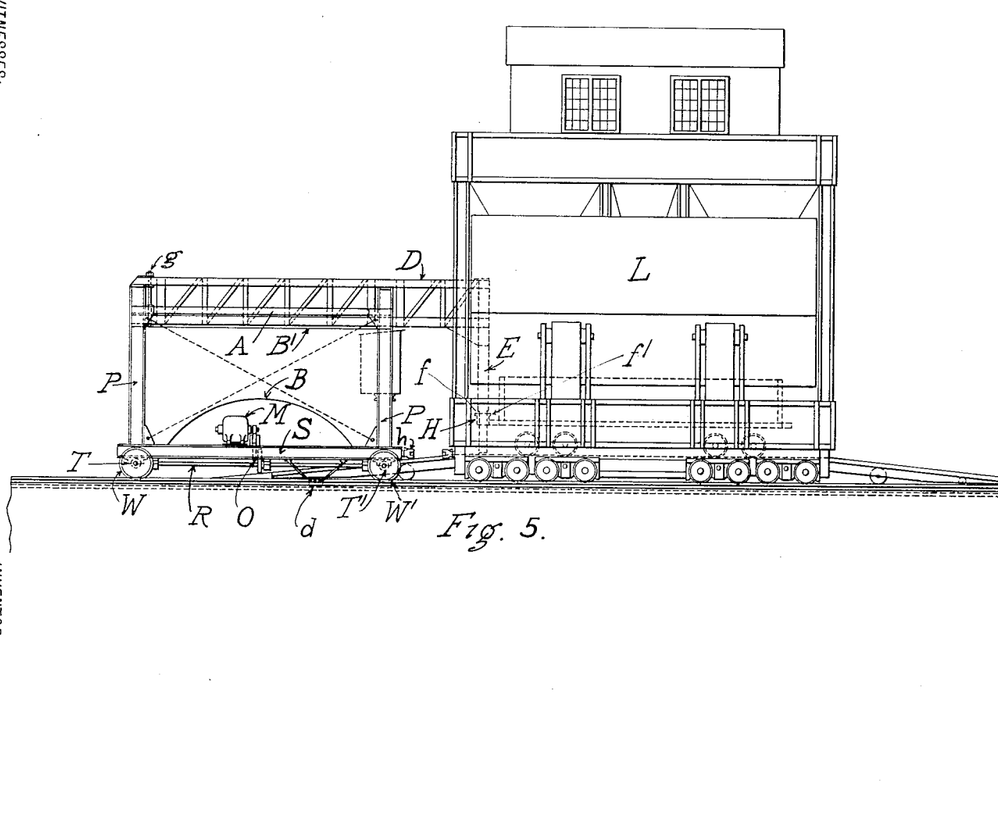
Fig. 5 is an enlarged view of the relative position of the pusher when the car is thereby brought within the tipple in its position for overturning.
Figure 6:
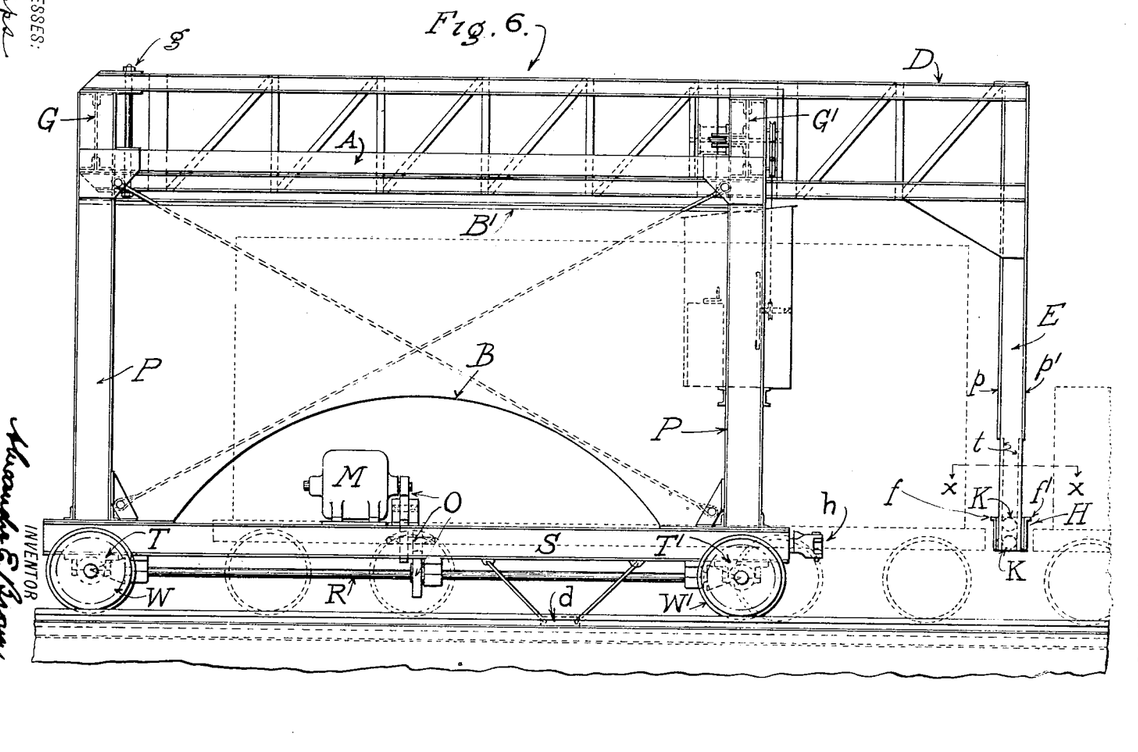
Fig. 6 is an enlarged side view of the pusher as a whole.
Figure 7:
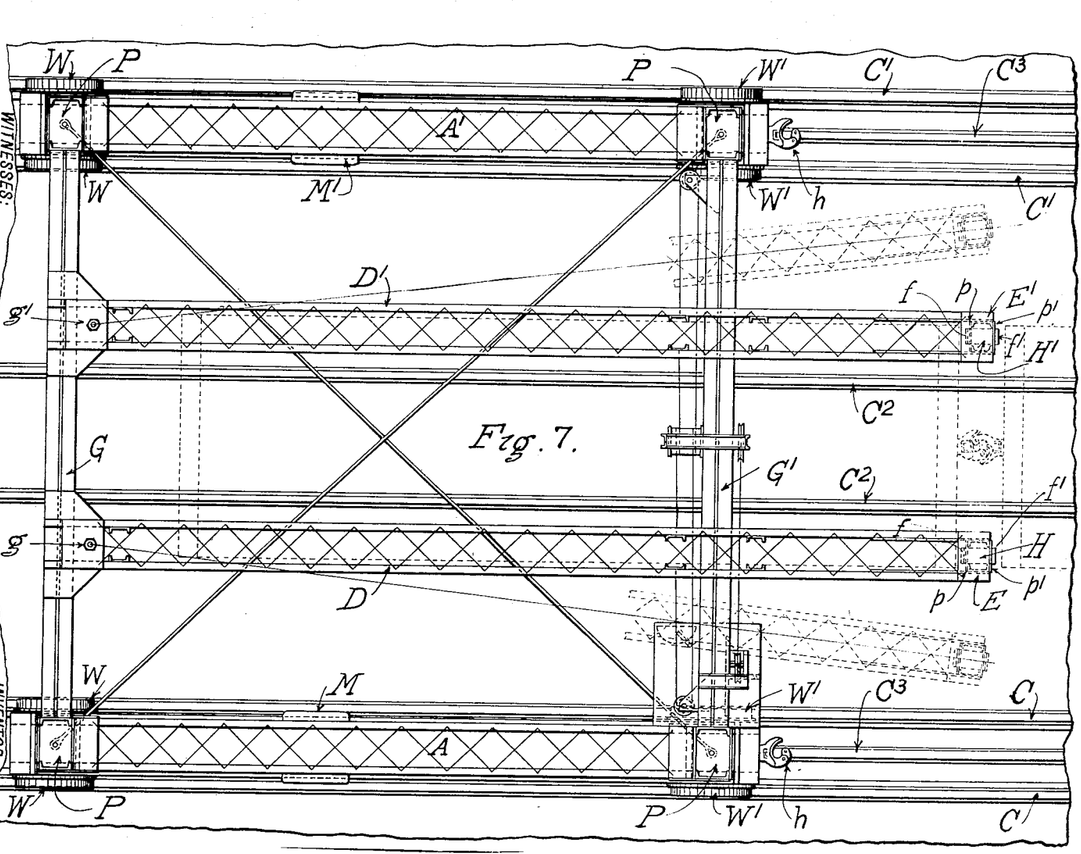
Fig. 7 is a plan view of the same.
Figure 8:
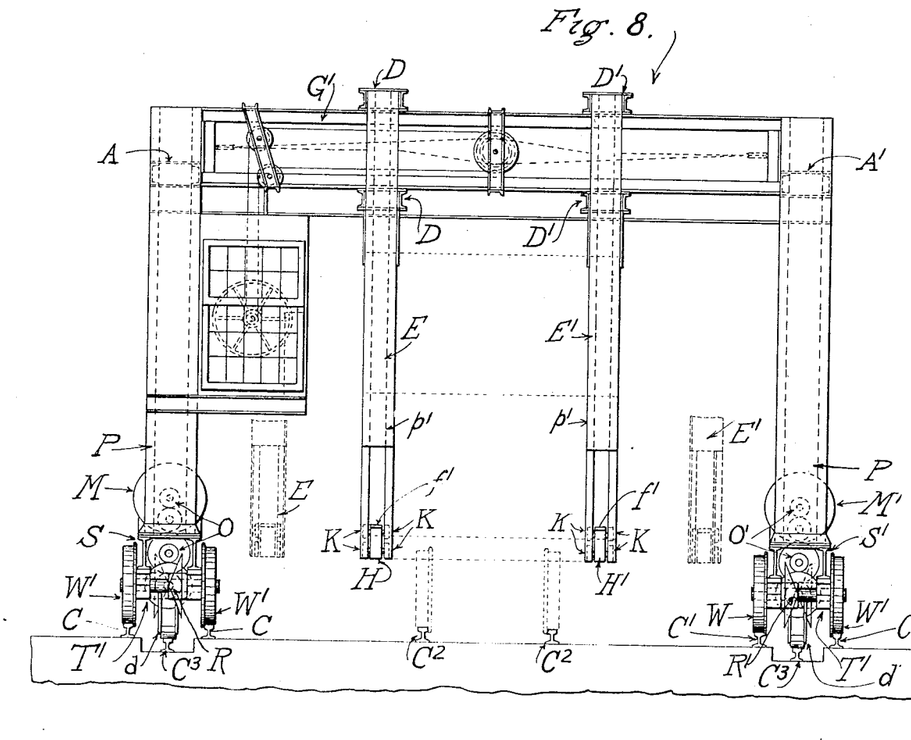
Fig. 8 is an end view of the same.
Figure 9:
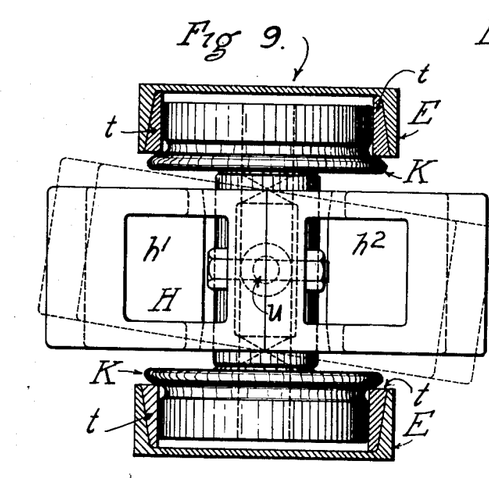
Fig. 9 is a sectional plan view, in the direction of the arrows, through $x$ $x$ in Fig. 6.
Figure 10:
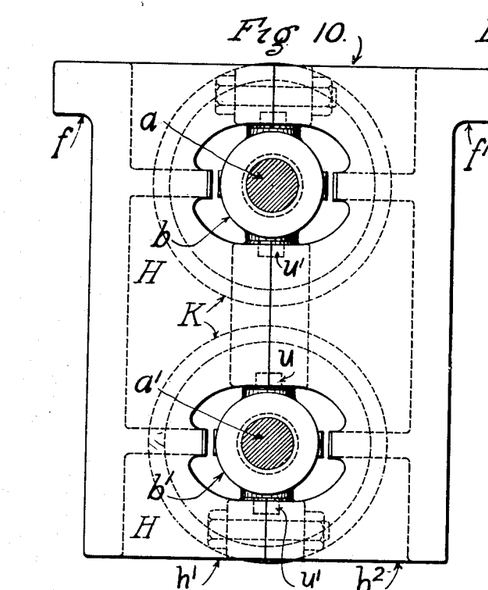
Fig. 10 is a side-elevation of details shown in Fig. 9.
Figure 11:
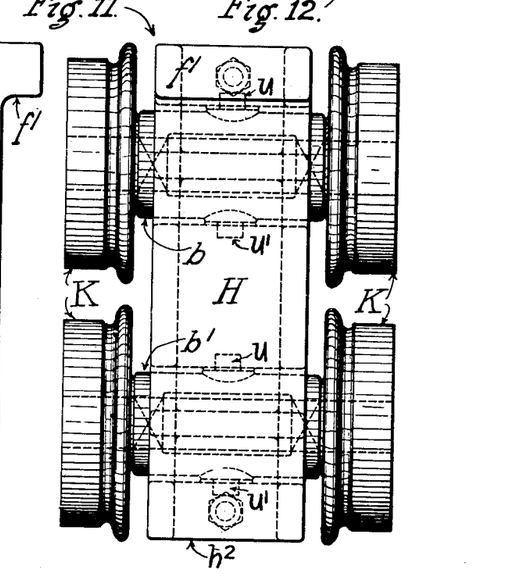
Fig. 11 is an end elevation of said details.

In order to actuate and control the arms D D', laterally about their pivot, and thereby engage and disengage the same from a car, and also to give clearance to the frame-work of the pusher when it is desired to run the same over a given car, to engage a car for instance, at the front or rear of the same, suitable means, as by the rope and sheave system indicated in dotted lines in Fig. 8 should be provided.

In order to enable a pusher to be used for bringing one or more cars to a particular place, as beneath the overhead tramway of the so-called "fast plants" of the hoisting class of machines, I have devised, and specifically claim herein, a specially arranged locomotive, preferably electric, which is illustrated in Figs. 14 to 18 inclusive. As will appear it is intended to travel on its own track $e'$ $e'$, which, unlike the form first described, lies entirely on one side of the track on which the car to be propelled travels and is substantially parallel therewith. The form shown in the drawings sets out a locomotive of this sort when operated between two parallel car tracks, and, under such conditions engaging and being able to push cars on either track, or on both at the same time. The method of propulsion thus shown also differs essentially from the first in omitting the forward arms D D', and, employing for their functions, the arms F F' that are pivoted vertically and are distensible laterally about their pivots, from the sills of the pusher-car, preferably near their central part. These arms, as shown, are attached to the sills and are afforded their pivotal movement by means of trunnions $k$ $k'$ which have their bearing on said sills.

As will be manifest the last described method of bringing up cars by said pusher, requires a special track for the same to be prepared along and parallel with those on which the cars themselves move and leading to the delivery point for the loads. If deemed necessary a second parallel car track may be provided immediately on the other side of the pusher-track, and, like the other, within range of the lateral arms F and F'. These tracks may of course, be either the main railroad tracks, or the yard-tracks on which cars are switched from the main tracks.

The pusher-locomotive can now be brought to the side of a given car, or train of cars, and the arms F or F', or both, as the case may be, thrust out behind such car, or any car in a train, and, in position to engage the cars and push them to any desired place along their tracks.

In the arrangement illustrated by Figs. 1 to 13 inclusive the rails of the track on which the pusher moves straddle the approach track to the tipple, and the frame-work above the truck is carried up above the height of cars, with a clear open space beneath the same. This construction, when the arms D D' are distended outwardly, permits the pusher to pass over any car or cars and, if desired, engage, for instance, one or more of the forward cars of a train, or, pass backwardly, over a train to engage cars at or toward the rear thereof, should it be desired to push the entire train, or more than one member of the same toward the tipple at one movement. In this case, as has been before observed, the tipple may be made portable and the pusher used to also couple to and pull or push the same from one station to another in the unloading district.

Having thus described my said invention, what I wish to secure by Letters Patent is:—

1. A locomotive for pushing cars of suitable dimensions to span the trackway of said cars, and provided with forwardly distensible arms for engaging the same for the purpose, substantially as shown and described.

2. A locomotive for pushing cars, along a track adjoining the track on which it is to move, and provided with laterally distensible arm or arms for the purpose, substantially as shown and described.

3. A car-pusher made up of the combination of trucks, or track-wheels therefor, an overhead frame-work or structure mounted on and carried by said trucks or wheels, of suitable dimensions to span the cars when brought above the same, distensible arms on said frame-work for engaging the cars, and suitable means for driving said trucks, or wheels, all substantially as shown and described.

4. The combination of a car-pusher, provided with trucks or track-wheels therefor, an overhead frame-work, mounted on and carried by said trucks or wheels, of suitable dimensions to span the cars when brought above the same, distensible arms on said frame-work for engaging the cars, a trackway for said trucks or wheels whose rails embrace or include the trackway for the cars, and suitable means for driving said trucks or wheels along their trackway, substantially as shown and described.

5. A car-pusher made up of the combination of trucks or track-wheels therefor, an over-head frame-work or structure, mounted and carried by said trucks or wheels, of suitable dimensions to span the cars when brought above the same, distensible arms upon said frame-work or structure extending downwardly at their front to engage the car to be pushed and provided at their lower ends with oscillating housings, as described, together with suitable means for driving said trucks or wheels along a trackway, provided for the purpose, that is inclusive of the track on which said cars are mounted and travel, substantially as shown and described.

6. A car-pusher made up of the combination of trucks or track-wheels therefor, a frame-work or structure mounted and carried by said trucks, of suitable dimensions to span the cars when brought above the same, distensible arms on said frame-work or structure for engaging the cars, suitable means for actuating said arms, and suitable means for driving said trucks or wheels along their rails or trackway, substantially as shown and described.

ALEXANDER E. BROWN.

In presence of—
WM. H. SMITH,
C. W. BROWN.